US012728408B2

(12) United States Patent
Cheng et al.

(10) Patent No.: US 12,728,408 B2
(45) Date of Patent: Sep. 8, 2026

(54) CATALYTIC PYROLYSIS OF PLASTICS TO PRODUCE PETROCHEMICAL FEEDSTOCK

(71) Applicants: W.R. Grace & Co.-Conn., Columbia, MD (US); Universidad Del Pais Vasco, Leioa (ES)

(72) Inventors: Wu-Cheng Cheng, Columbia, MD (US); Robert Hibbard Harding, Woodstock, MD (US); Alessia Padovani, Baden Wurttemberg (DE); Guang Yuan, Clarksville, MD (US); Gartzen Lopez Zabalbeitia, Leioa (ES); Martin Olazar Aurrecoechea, Leioa (ES)

(73) Assignees: W.R. GRACE & CO.-CONN., Columbia, MD (US); UNIVERSIDAD DEL PAIS VASCO, Leioa (ES)

(*) Notice: Subject to any disclaimer, the term of this patent is extended or adjusted under 35 U.S.C. 154(b) by 194 days.

(21) Appl. No.: 18/699,248

(22) PCT Filed: Oct. 5, 2022

(86) PCT No.: PCT/US2022/045807
§ 371 (c)(1),
(2) Date: Apr. 5, 2024

(87) PCT Pub. No.: WO2023/059738
PCT Pub. Date: Apr. 13, 2023

(65) Prior Publication Data

US 2025/0145895 A1 May 8, 2025

Related U.S. Application Data

(60) Provisional application No. 63/252,861, filed on Oct. 6, 2021.

(51) Int. Cl.
*B01J 29/40* (2006.01)
*B01J 35/40* (2024.01)
(Continued)

(52) U.S. Cl.
CPC ............... *B01J 29/40* (2013.01); *B01J 35/40* (2024.01); *C10B 53/07* (2013.01); *C10B 57/06* (2013.01);
(Continued)

(58) Field of Classification Search
CPC ........... B01J 29/40; B01J 35/40; C10B 53/07; C10B 57/06; C10G 1/10; C10G 2300/1003; C10G 2400/20; C10G 2400/30
See application file for complete search history.

(56) References Cited

U.S. PATENT DOCUMENTS 9,447,332 B2 * 9/2016 Narayanaswamy ... B01J 8/1836
10,654,009 B1 5/2020 Yelvington et al.
(Continued)

FOREIGN PATENT DOCUMENTS

CN 104583122 A 4/2015
CN 105102587 A 11/2015
(Continued)

OTHER PUBLICATIONS

Elordi, G., Olazar, M., Lopez, G., Amutio, M., Artetxe, M., Aguado, R., Bilbao, J., "Catalytic pyrolysis of HDPE in continuous mode over zeolite catalysts in a conical spouted bed reactor", J. Anal. Appl. Pyrolysis, 2009, 85, 345-351 (Year: 2009).*
(Continued)

*Primary Examiner* — James C Goloboy
(74) *Attorney, Agent, or Firm* — DORITY & MANNING, P.A.

(57) ABSTRACT

The present technology is generally related to the process of converting plastics to olefin and aromatics through pyroly-
(Continued)

sis, wherein the process of producing at least one or more of olefins and aromatic compounds from a plastic feedstock includes: contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds and wherein the catalyst composition includes greater than about 40% w/w of ZSM-5, based on the total weight of the catalyst composition.

20 Claims, 4 Drawing Sheets

(51) Int. Cl.
*C10B 53/07* (2006.01)
*C10B 57/06* (2006.01)
*C10G 1/10* (2006.01)

(52) U.S. Cl.
CPC ....... *C10G 1/10* (2013.01); *C10G 2300/1003* (2013.01); *C10G 2400/20* (2013.01); *C10G 2400/30* (2013.01)

(56) References Cited

U.S. PATENT DOCUMENTS

2011/0207984 A1 8/2011 Almeida et al.
2011/0230690 A1 9/2011 Tiita et al.
2014/0228204 A1 8/2014 Narayanaswamy et al.
2015/0175900 A1* 6/2015 Smith ...................... B01J 21/16 502/68

FOREIGN PATENT DOCUMENTS

EP 2161321 A2 3/2010
WO WO 2000/053548 A1 9/2000
WO WO 2020/204707 A1 10/2020

OTHER PUBLICATIONS

Orozco, S., Alvarez, J., Lopez, G., Artetxe, M., Bilbao, J., Olazar, M., “Pyrolysis of plastic wastes in a fountain confined conical spouted bed reactor: Determination of stable operating conditions”, Energy Conversion and Management, 2021, 229, 113768 (Year: 2021).*
Opinion of Examination on TW Appl. No. 111138003, Dtd Feb. 29, 2024.
Elordi et al., “Catalytic Pyrolysis of HDPE in Continuous Mode Over Zeolite Catalysts in a Conical Spouted Bed Reactor” J. Anal. Appl. Pyrol., vol. 85, Issue 1-2, pp. 345-351, Nov. 5, 2008.
Saldarriaga et al. “Distribution of Cycle Times in Sawdust Conical Spouted Bed Equipped with Fountain Confiner and Draft Tube” Ind. Eng. Chem. Res. 2019, 58, 5, 1932-1940.
Estiati et al “Design Factors in Fountain Confined Conical Spouted Beds” Chemical Engineering and Processing—Process Intensification vol. 155, Sep. 2020.

* cited by examiner (b)

(a)

CATALYTIC PYROLYSIS OF PLASTICS TO PRODUCE PETROCHEMICAL FEEDSTOCK

CROSS REFERENCE TO RELATED APPLICATIONS

This application is a U.S. National Stage of International Patent Application No. PCT/US2022/045807, filed Oct. 5, 2022, which claims the benefit of priority to U.S. Provisional Patent Application No. 63/252,861 filed Oct. 6, 2021, the contents of which are incorporated herein by reference in their entireties.

FIELD

The present technology is generally related to the conversion of plastics to olefin and aromatics through pyrolysis. Specifically, the technology is related to catalyst compositions that include greater than 40% w/w of ZSM-5, and methods of preparing and using such compositions in a conical spouted bed reactor for the catalytic pyrolysis of plastics to olefins and aromatic compounds.

BACKGROUND

Catalytic pyrolysis, which involves the degradation of the polymeric materials by heating them in the absence of oxygen and in the presence of a catalyst, represents an attractive method for recycling plastic waste. Silica-alumina, zeolites, and fluid catalytic cracking (FCC) catalysts are commonly used to lower the energy requirement, influence the composition of the product through cracking, and reduce the process time. While catalytic pyrolysis has been extensively studied, there remains a need to develop more efficient catalytic pyrolysis methods that maximize of the yield of desirable products, such as light olefins and aromatic compounds, and minimize the yield of undesirable products, such as methane and ethane. In particular, propylene is a particular light olefin in high demand as it is used in many of the world's largest and fastest growing synthetic materials and thermoplastics.

This disclosure provides a method for the catalytic pyrolysis of waste plastics using a spouted bed reactor including a draft tube and a confiner with a catalyst composition including greater than 40% w/w of ZSM-5 to provide petrochemical feedstocks, such as ethylene, propylene, butylene, in high yield.

SUMMARY

In one aspect is a process of producing at least one or more of olefins and aromatic compounds from a plastic feedstock, the process including: contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds; wherein the catalyst composition includes greater than about 40% w/w of ZSM-5, based on the total weight of the catalyst composition.

In some embodiments, the catalyst composition includes greater than about 45% w/w, about 55% w/w, about 60% w/w, about 65% w/w, about 70% w/w, about 75% w/w, or about 80% w/w of ZSM-5, based on the total weight of the catalyst composition.

In some embodiments, the catalyst composition includes from about 40% w/w to about 80% w/w, from about 45% w/w to about 80% w/w, from about 50% w/w to about 80% w/w, from about 55% w/w to about 80% w/w, from about 60% w/w to 80% w/w, from about 65% w/w to about 80% w/w, from about 70% w/w to about 80 w/w, or from about 75% w/w to about 80% w/w of ZSM-5, based on the total weight of the catalyst composition.

In some embodiments, the catalyst composition includes particles having a size ranging from about 0.05 mm to about 5 mm. In some embodiments, the catalyst composition includes particles having a size of from about 0.8 mm to about 5 mm or from about 1.0 mm to about 2.5 mm.

In some embodiments, the catalyst composition includes particles having a size of about 0.05, about 0.06 mm, about 0.07 mm, about 0.08 mm, about 0.09 mm, about 0.1 mm, about 0.2 mm, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5 mm.

In some embodiments, the catalyst composition includes from about 5% w/w to about 15% w/w $P_2O_5$, based on the total weight of the composition. In some embodiments, the catalyst composition includes about 5%, about 6% w/w, about 7% w/w, about 8% w/w, about 9% w/w, about 10% w/w, about 11% w/w, about 12% w/w, about 13% w/w, about 14% w/w, or about 15% w/w of $P_2O_5$, based on the total weight of the composition.

In some embodiments, the catalyst composition includes no greater than about 40% w/w $Al_2O_3$, based on the total weight of the composition.

In some embodiments, the ZSM-5 has a crystallite size of less than about 0.4 microns.

In some embodiments, the catalyst composition is formed by spray drying, extrusion, or a bead forming method. In some embodiments, the bead forming method is agglomeration.

In some embodiments, the ZSM-5 is combined with an active matrix within a particle. In some embodiments, the ZSM-5 is combined with an active matrix as a separate particle.

In some embodiments, the ZSM-5 is combined with one or more zeolites selected from ZSM-11, faujasite, mordenite, and beta. In some embodiments, the combination of ZSM-5 with one or more zeolites promotes pyrolysis of large molecules.

In some embodiments, the ZSM-5 is combined with one or more Y-type zeolites selected from Zeolite Y, ultrastable Y zeolite (USY), rare earth exchanged Y (REY), rare earth exchanged USY (REUSY), dealuminated Y (DeAIY), and ultrahydrophobic Y (UHPY) as a separate particle.

In some embodiments, contacting the plastic feedstock and the catalyst composition is at a temperature of from about 500° C. to about 600° C. In some embodiments, contacting the plastic feedstock and the catalyst composition is at a temperature of about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., or about 650° C.

In some embodiments, the plastic feedstock includes at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent. In some embodiments, the plastic feedstock includes polyethylene (e.g., high-density polyethylene (HDPE)) dissolved in a solvent. In some embodiments, the plastic feedstock includes polypropylene dissolved in a solvent.

In some embodiments, the at least one or more olefins is selected from ethylene, propylene, and butenes. In some embodiments, the process converts the plastic feedstock to greater than about 35 wt %, about 40 wt %, about 45 wt %, about 50 wt %, about 55 wt %, about 60 wt %, about 65 wt %, or about 70 wt % of ethylene, propylene, and butenes. In some embodiments, the process converts the plastic feedstock to greater than about 20 wt %, about 25 wt %, about 35 wt %, about 40 wt %, about 45 wt %, about 50 wt %, about 55 wt %, about 60 wt %, about 65 wt %, or about 70 wt % of propylene.

In some embodiments, the at least one or more aromatic compounds is selected from benzene, toluene, and xylenes.

In some embodiments, the time period sufficient to allow at least a portion of the plastic feedstock to be converted to at least one or more olefins and aromatic compounds is a space time ranging from about 0.2 to about 10 hours.

In some embodiments, the conical spouted bed reactor comprises a draft tube and a confiner. As shown in FIG. 4, in some embodiments, the conical spouted bed reactor has a gas inlet opening of $D_O$ and a diameter of the cylindrical section of the conical spouted bed reactor of $D_C$; the confiner has a diameter of DG; and the draft tube has a distance from the top of the draft tube and the bottom of the draft tube of $H_G$. In some embodiments, $H_G$ may be from about 3 to about $4 \times D_O$. In some embodiments, $H_G$ may be from about 1.5 to $2.5 \times D_O$. In some embodiments, $H_G$ may be about $2 \times D_O$. In some embodiments, $D_G$ may be from about $3 \times D_O$ to about 0.7 $D_C$. In some embodiments, wherein $D_G$ may be about 4 to about $6 \times D_O$. In some embodiments, $D_G$ is about $5 \times D_O$.

DETAILED DESCRIPTION

Figure 1:
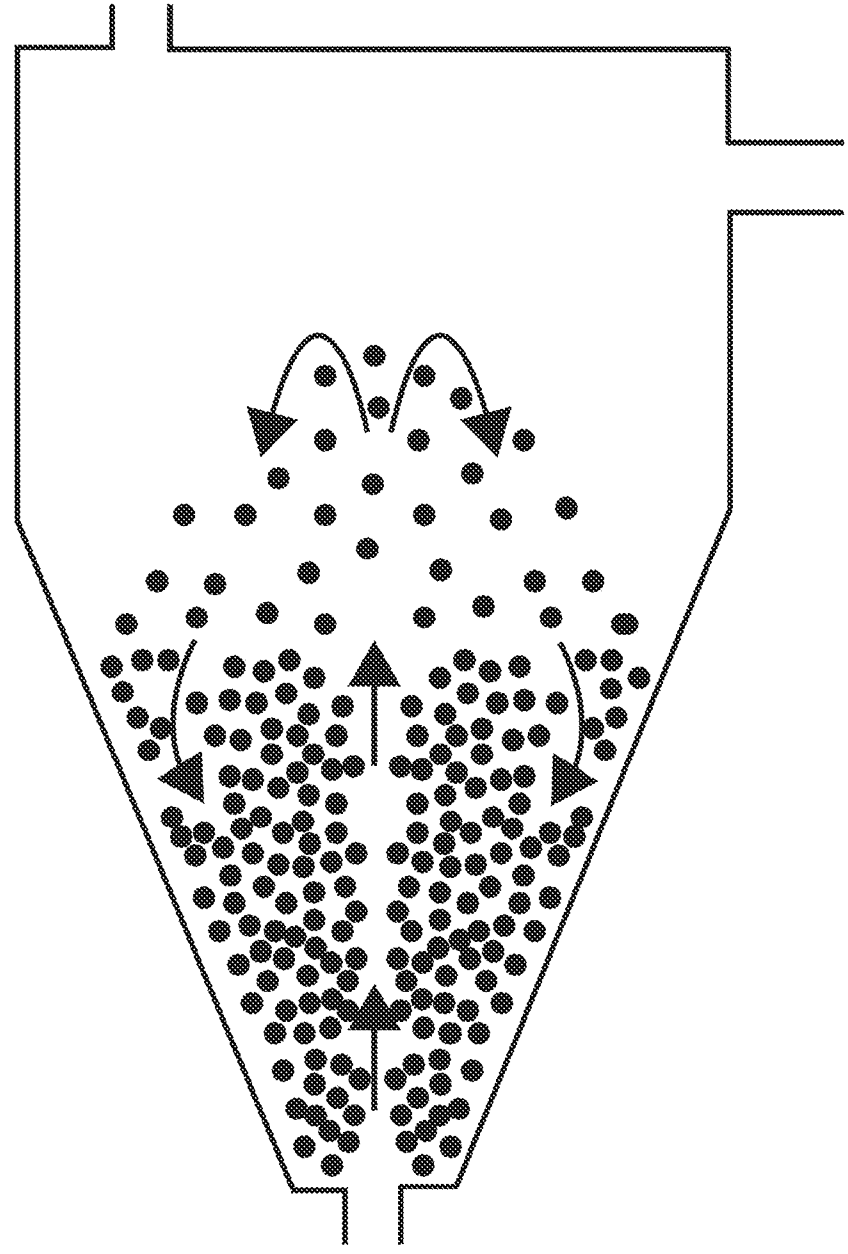
FIG. 1 is a schematic depiction of a conventional spouted bed reactor from the prior art.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Disclosed herein is a process for converting waste plastics to valuable petrochemical feedstocks, such as propylene, in high yields using a spouted bed reactor including a draft tube and a confiner and a catalyst composition including greater than about 40% w/w of ZSM-5, based on the total weight of the catalyst composition.

As shown in the Examples, the inventors of this disclosure discovered that using a spouted bed reactor including a draft tube and a confiner in combination with catalyst including greater than 40% w/w of ZSM-5 can catalytically convert plastics to petrochemical feedstocks, such as ethylene, propylene, butylene, in high yields. These petrochemical feedstocks may be reprocessed into useful plastics for a more circular economy.

ZSM-5 Catalyst Compositions

The catalyst compositions described herein include greater than 40% w/w of ZSM-5 (U.S. Pat. No. 3,702,886 and RE29,948), a shape selective zeolite, based on the total weight of the catalyst composition. In some embodiments, the catalyst composition includes greater than about 45% w/w, about 55% w/w, about 60% w/w, about 65% w/w, about 70% w/w, about 75% w/w, or about 80% w/w of ZSM-5, based on the total weight of the catalyst composition.

In some embodiments, the catalyst composition includes from about 40% w/w to about 80% w/w, from about 45% w/w to about 80% w/w, from about 50% w/w to about 80% w/w, from about 55% w/w to about 80% w/w, from about 60% w/w to 80% w/w, from about 65% w/w to about 80% w/w, from about 70% w/w to about 80 w/w, or from about 75% w/w to about 80% w/w of ZSM-5, based on the total weight of the catalyst composition. In some embodiments, the catalyst composition includes about 40% w/w, about 45% w/w, about 55% w/w, about 60% w/w, about 65% w/w, about 70% w/w, about 75% w/w, or about 80% w/w of ZSM-5, based on the total weight of the catalyst composition.

The catalyst composition described herein may include particles having a size ranging from about 0.05 mm to about 5 mm. In some embodiments, the catalyst composition includes particles having a size of from about 0.8 mm to about 5 mm or from about 1.0 mm to about 2.5 mm. In some embodiments, catalyst composition includes particles having a size of about 0.05, about 0.06 mm, about 0.07 mm, about 0.08 mm, about 0.09 mm, about 0.1 mm, about 0.2 mm, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5 mm, about 3.0 mm, about 3.5 mm, about 4.0 mm, about 4.5 mm, or about 5.0 mm.

The catalyst composition described herein may include from about 5% w/w to about 15% w/w $P_2O_5$, based on the total weight of the composition. In some embodiments, the catalyst composition includes about 5%, about 6% w/w, about 7% w/w, about 8% w/w, about 9% w/w, about 10% w/w, about 11% w/w, about 12% w/w, about 13% w/w, about 14% w/w, or about 15% w/w of $P_2O_5$, based on the total weight of the composition.

The catalyst composition described herein may include no greater than about 40% w/w $Al_2O_3$, based on the total weight of the composition, including no greater than about 35% w/w, no greater than about 30% w/w, no greater than about 25% w/w, and no greater than about 20% w/w. In some embodiments, the catalyst composition includes about 40% w/w, about 35% w/w, about 30% w/w, about 25% w/w, about 20% w/w $Al_2O_3$ based on the total weight of the composition.

In some embodiments, the ZSM-5 has a crystallite size of less than about 0.4 microns, including about less than about 0.3, less than about 0.2, less than about 0.1, less than about 0.09, less than about 0.08, less than about 0.07, less than about 0.06, less than about 0.05, less than about 0.04, less than about 0.03, less than about 0.02, and less than about 0.01 microns. In some embodiments, the ZSM-5 has a crystallite size of from about 0.01 microns to about 0.4 microns, including about 0.01, about 0.02, about 0.03, about 0.04, about 0.05, about 0.06, about 0.07, about 0.08, about 0.09, about 0.1, about 0.2, about 0.3, or about 0.4 microns.

The catalyst compositions described herein may be formed by spray drying, extrusion, or a bead forming method, such as agglomeration. In some embodiments, the catalyst composition is formed by spray drying. In some embodiments, the catalyst composition is formed by extrusion. In some embodiments, the catalyst composition is formed by a bead forming method, including agglomeration.

In some embodiments, the ZSM-5 is combined with an active matrix within a particle. In some embodiments, the ZSM-5 is combined with an active matrix as a separate particle.

In some embodiments, the ZSM-5 is combined with one or more zeolites selected from ZSM-11, faujasite, mordenite, and beta. In some embodiments, the combination of ZSM-5 with one or more zeolites promotes pyrolysis of large molecules.

In some embodiments, the ZSM-5 is combined with one or more Y-type zeolites selected from Zeolite Y (U.S. Pat. No. 3,130,007), ultrastable Y zeolite (USY) (U.S. Pat. No. 3,449,070), rare earth exchanged Y (REY) (U.S. Pat. No. 4,415,438), rare earth exchanged USY (REUSY), dealuminated Y (DeAIY) (U.S. Pat. Nos. 3,442,792 and 4,331,694), and ultrahydrophobic Y (UHPY) (U.S. Pat. No. 4,401,556) as a separate particle.

Conical Spouted Bed Reactors

The use of spouted bed reactors to carry out reactions of plastics pyrolysis has been disclosed; however, the spouted bed reactors that have been disclosed prior to this disclosure do not have a draft tube or a confiner. Furthermore, the catalysts used with these spouted bed reactors were extrudates containing approximately 20 to 25% fresh ZSM-5 and were not deactivated to simulate commercial performance.

FIG. 1 shows a schematic diagram of a conventional conical spouted bed reactor disclosed in the prior art and does not have a draft tube or a confiner. An inert gas, such as nitrogen or steam, is introduced into the bed of catalyst through an orifice at the base of the reactor. The flowing gas creates a cylindrical path, or spout, through the catalyst bed. Catalyst, entrained by the gas flowing through the spout, is propelled above the surface of the catalyst bed and settles back down in the shape of a fountain. The catalyst moves downward in the annular region back to the bottom of the conical bed, thus completing the cycle. The rapid circulation of the catalyst and reactants ensures good mixing in the reactor. The fountain is a region of low catalyst density, called the dilute phase, and the annulus is a region of high catalyst density, called the dense phase. In the absence of a draft tube, some of the gas flows around the spout and through the annular region.

Figure 2:
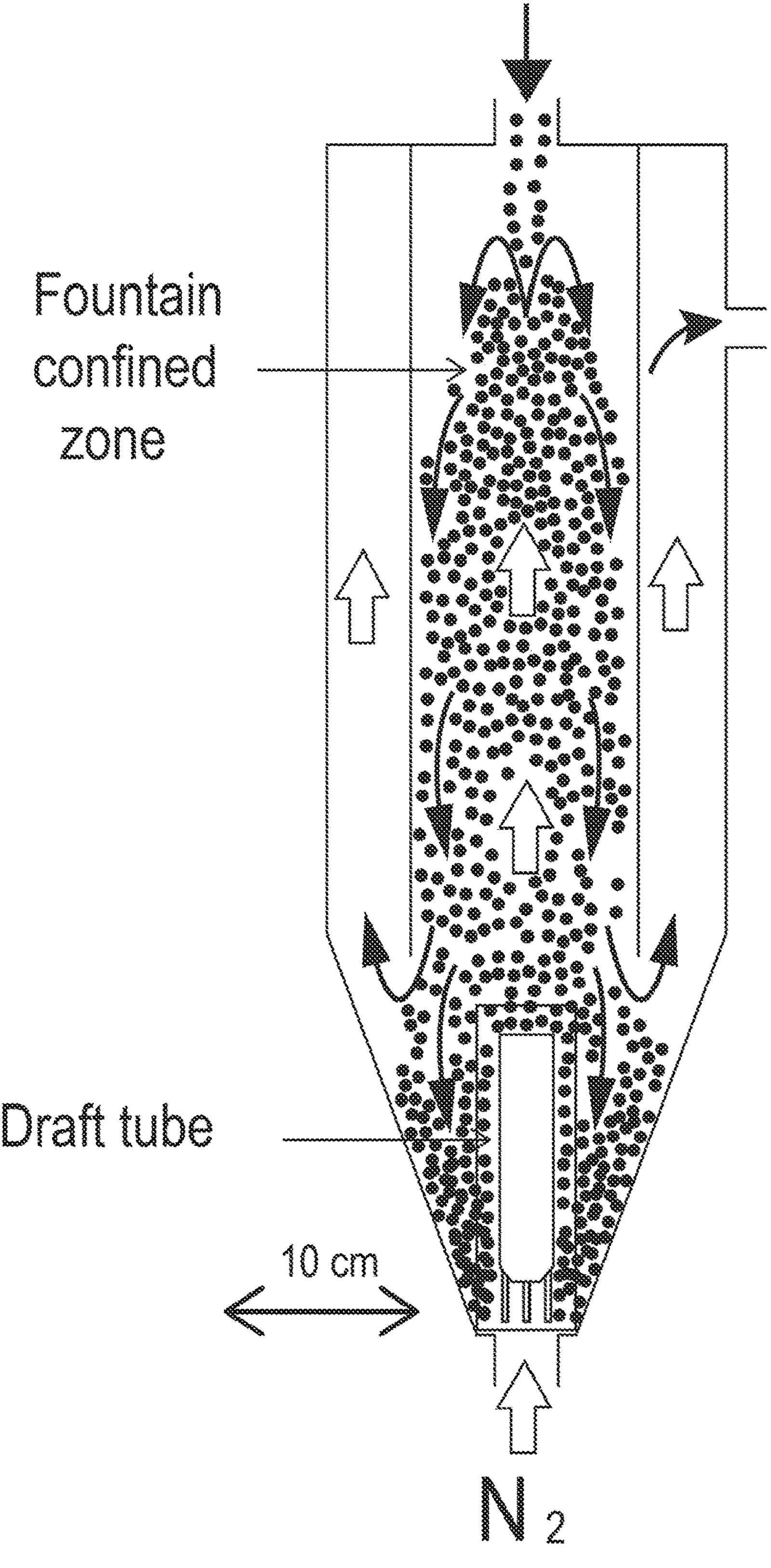
FIG. 2 is a schematic depiction of a spouted bed reactor with a draft tube and a confiner, according to an illustrative embodiment.
Figure 3:
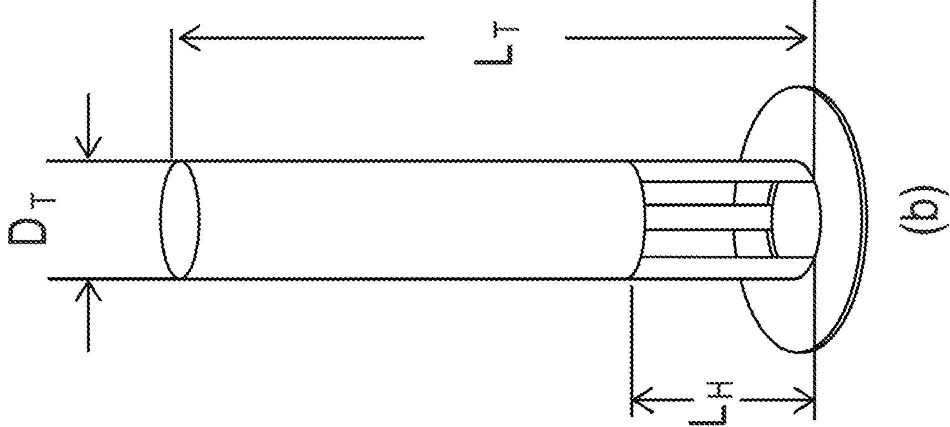
FIG. 3 is a schematic depiction of two illustrative embodiments of draft tubes, with open side wall and closed side wall.
Figure 3:
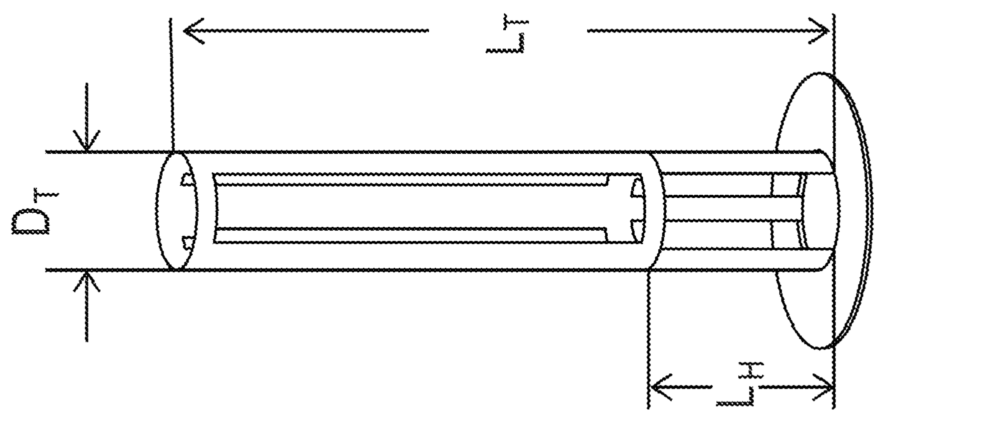
Figure 3:
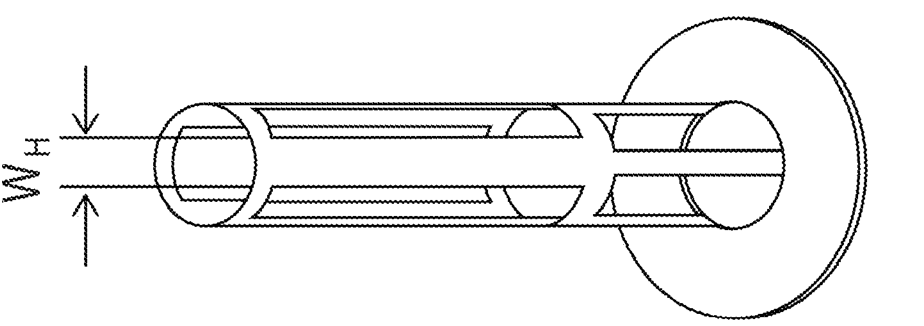

In contrast, the catalytic pyrolysis process of plastic waste described herein uses a conical spouted bed reactor including a draft tube and a confiner. FIG. 2 shows a schematic diagram of an illustrative embodiment. FIG. 3 shows two examples of draft tubes, with open side wall and closed side wall. The gas, flowing through the draft tube, creates a region of negative pressure, at the bottom of the tube, which pulls in catalyst from the annular region and propels it up the draft tube. The confiner, which is closed at the top, redirects the catalyst downward.

The draft tube directs the gas through the spout so that less gas travels through the annulus, as compared to the conventional spouted bed reactor. Thus, the minimum spouting velocity, in the presence of the draft tube, is much lower than in the absence of the draft tube.

The confiner confines the dilute phase to a smaller volume with more turbulent mixing. The feedstock, added to the confiner, is rapidly mixed with the catalyst. The higher collision frequency between the catalyst and the plastics leads to faster heat transfer, melting of plastics and distribution of molten plastics throughout the catalyst.

Figure 4:
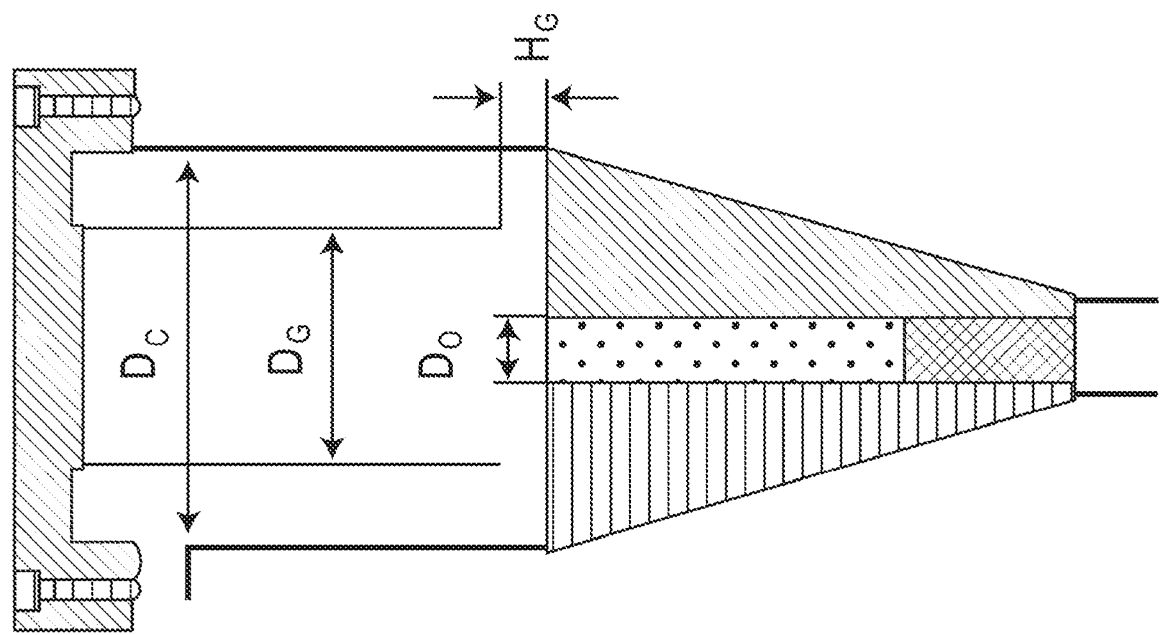
FIG. 4 is a schematic depiction of the arrangement of a draft tube and confiner with the dimensions illustrated.

FIG. 4 shows an illustrative embodiment of draft tube and confiner arrangement with key dimensions. The conical spouted bed reactor has a gas inlet opening of $D_O$ and a diameter of the cylindrical section of the conical spouted bed reactor of $D_C$. The confiner has a diameter of $D_G$. The draft tube has a distance from the top of the draft tube and the bottom of the draft tube of $H_G$.

In some embodiments, $H_G$ may be from about 3 to about $4 \times D_O$ or from about 1.5 to $2.5 \times D_O$. In some embodiments, $H_G$ is about $2 \times D_O$.

In some embodiments, $D_G$ may be from about $3 \times D_O$ to about 0.7 $D_C$ or from about 4 to about $6 \times D_O$. In some embodiments, $D_G$ is about $5 \times D_O$.

Catalytic Pyrolysis

Described herein is a process of producing at least one or more of olefins and aromatic compounds from a plastic feedstock, the process including: contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds; wherein the catalyst composition includes greater than about 40% w/w of ZSM-5, based on the total weight of the catalyst composition.

In some embodiments, contacting the plastic feedstock and the catalyst composition is at a temperature of from about 500° C. to about 600° C., including about 525° C. to about 575° C. In some embodiments, contacting the plastic feedstock and the catalyst composition is at a temperature of about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., or about 650° C. In some embodiments, contacting the plastic feedstock and the catalyst composition is at a temperature of about 550° C.

The plastic feedstock described herein may include at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent. In some embodiments, the plastic feedstock includes polyethylene (e.g., high-density polyethylene (HDPE)) dissolved in a solvent. In some embodiments, the plastic feedstock includes polypropylene dissolved in a solvent.

For the catalytic processes described herein, the reaction products may include at least one or more olefins is selected from ethylene, propylene, and butenes (e.g., light olefins). In some embodiments, the process converts the plastic feedstock to greater than about 35 wt %, about 40 wt %, about 45 wt %, about 50 wt %, about 55 wt %, about 60 wt %, about 65 wt %, or about 70 wt % of ethylene, propylene, and butenes. In some embodiments, the process converts the plastic feedstock to about 35 wt %, about 40 wt %, about 45 wt %, about 50 wt %, about 55 wt %, about 60 wt %, about 65 wt %, or about 70 wt % of ethylene, propylene, and butenes.

In some embodiments, for the catalytic processes described herein provide a high yield of propylene. In some embodiments, the process converts the plastic feedstock to greater than about 20 wt %, about 25 wt %, about 35 wt %, about 40 wt %, about 45 wt %, about 50 wt %, about 55 wt %, about 60 wt %, about 65 wt %, or about 70 wt % of propylene. In some embodiments, the process converts the plastic feedstock to about 20 wt %, about 25 wt %, about 35 wt %, about 40 wt %, about 45 wt %, about 50 wt %, about 55 wt %, about 60 wt %, about 65 wt %, or about 70 wt % of propylene.

The reaction products for the catalytic processes described herein, may include at least one or more aromatic compounds is selected from benzene, toluene, and xylenes. In some embodiments, the process converts the plastic feedstock to greater than about 20 wt %, about 25 wt %, about 35 wt %, about 40 wt %, about 45 wt %, about 50 wt %, about 55 wt %, about 60 wt %, about 65 wt %, or about 70 wt % of one or more aromatic compounds. In some embodiments, the process converts the plastic feedstock to about 20 wt %, about 25 wt %, about 35 wt %, about 40 wt %, about 45 wt %, about 50 wt %, about 55 wt %, about 60 wt %, about 65 wt %, or about 70 wt % of one or more aromatic compounds.

The time period sufficient to allow at least a portion of the plastic feedstock to be converted to at least one or more olefins and aromatic compounds is a space time ranging from about 0.2 to about 10 hours; including about 0.2, about 0.3, about 0.4, about 0.5, about 0.6, about 0.7, about 0.8, about 0.9, about 1, about 1.5, about 2, about 2.5, about 3, about 3.5, about 4, about 4.5, about 5, about 5.5, about 6, about 6.5, about 7, about 7.5, about 8, about 8.5, about 9, about 9.5, or about 10 hours. As used herein, space time refers to 1/WHSV (weight hourly space velocity) or "weight of catalyst in reactor"/"feed rate per hour."

In some embodiments, the time period sufficient to allow at least a portion of the plastic feedstock to be converted to at least one or more olefins and aromatic compounds is the gas phase residence time (from about 0.5 to about 5 seconds) and/or catalyst residence time (from about 2 to about 10 minutes). In some embodiments, the gas phase residence time is from about 0.5 to about 5 seconds, including about 0.5, about 1, about 1.5, about 2, about 2.5, about 3, about 3.5, about 4, about 4.5, and about 5 seconds. In some embodiments, the catalyst residence time is from about 2 to about 10 minutes, including about 2, about 2.5, about 3, about 3.5, about 4, about 4.5, about 5, about 5.5, about 6, about 6.5, about 7, about 7.5, about 8, about 8.5, about 9, about 9.5, or about 10 minutes.

The present invention, thus generally described, will be understood more readily by reference to the following examples, which are provided by way of illustration and are not intended to be limiting of the present invention.

EXAMPLES

Example 1

The use of spouted bed reactors to carry out reactions of plastics pyrolysis has been disclosed; however, the spouted bed reactors that have been disclosed prior to this disclosure do not have a draft tube or a confiner. Furthermore, the catalysts used with these spouted bed reactors were extrudates containing approximately 20 to 25% fresh ZSM-5 and were not deactivated to simulate commercial performance.

A schematic diagram of a conventional conical spouted bed reactor, with no draft tube or confiner, is shown in FIG. 1 and was used in the following examples. An inert gas, such as nitrogen or steam, is introduced into the bed of catalyst through an orifice at the base of the reactor. The flowing gas creates a cylindrical path, or spout, through the catalyst bed. Catalyst, entrained by the gas flowing through the spout, is propelled above the surface of the catalyst bed and settles back down in the shape of a fountain. The catalyst moves downward in the annular region back to the bottom of the conical bed, thus completing the cycle. The rapid circulation of the catalyst and reactants ensure good mixing in the reactor. The fountain is a region of low catalyst density, called the dilute phase, and the annulus is a region of high catalyst density, called the dense phase. In the absence of a draft tube, some of the gas flows around the spout and through the annular region.

Example 2

FIG. 2 shows a schematic diagram of a spouted bed reactor with a draft tube and a confiner (top) that was used in the following examples. Two examples of draft tubes, with open side wall and closed side wall, are shown in FIG. 3. The gas, flowing through the draft tube, creates a region of negative pressure, at the bottom of the tube, which pulls in catalyst from the annular region and propels it up the draft tube. The confiner, which is closed at the top, redirects the catalyst downward.

The draft tube directs the gas through the spout so that less gas travels through the annulus, as compared to the conventional spouted bed reactor. Thus, the minimum spouting velocity, in the presence of the draft tube, is much lower than in the absence of the draft tube.

The confiner confines the dilute phase to a smaller volume with more turbulent mixing. The feedstock, added to the confiner, is rapidly mixed with the catalyst. The higher collision frequency between the catalyst and the plastics leads to faster heat transfer, melting of plastics and distribution of molten plastics throughout the catalyst.

The key dimensions of the draft tube and confiner arrangement are shown in FIG. 4. DO refers to the gas inlet opening of the spouted bed. DC refers to the diameter of the cylindrical section of the spouted bed and DG refers to the diameter of the confiner. HG refers to the distance from the top of the draft tube and the bottom of the confiner. HG may be from about 3 to 4×DO. In some embodiments, HG may be from about 1.5 to 2.5 DO. In some embodiments, HG should be about 2×DO. In some embodiments, DG may be from about 3×DO to 0.7×DC. In some embodiments, DG may be from about 4 to 6×DO, or about 5×DO.

Example 3

Agglomerated catalyst samples with 2 mm average particle size were prepared as described below. Dry powders of ZSM-5, pseudoboehmite alumina and halloysite clay were mixed thoroughly in an Eirich mixer. While under agitation, water or a solution of phosphoric acid and water were sprayed on the powder. The resulting agglomerates were dried, calcined, and steamed for 24 hours at 1500° F. to simulate the deactivation of the catalyst during commercial application. A catalyst showing an illustrative embodiment (Catalyst A), containing 40% ZSM-5, and a comparative sample (Catalyst B), containing 30% ZSM-5 but higher pseudoboehmite content were prepared. Properties of the catalysts are shown in Table 1.

TABLE 1

Properties of beaded catalysts.

| | Catalyst A 40% ZSM-5 5% $Al_2O_3$ 5% $P_2O_5$ 50% Clay | Catalyst B 30% ZSM-5 16% $Al_2O_3$ 4% $P_2O_5$ 50% Clay |
|---|---|---|
| ABD ($g/cm^3$) | 0.90 | 0.84 |
| $Al_2O_3$ (%) | 28.9 | 39.8 |
| $Fe_2O_3$ (%) | 1.1 | 1.1 |
| $Na_2O$ (%) | 0.15 | 0.13 |
| $P_2O_5$ (%) | 3.6 | 2.8 |
| Average Particle Size (mm) | 2 | 1.7 |
| BET Surface Area ($m^2/g$) | 194 | 184 |

Example 4

135 grams of Catalyst A, from Example 3, was charged into a conventional spouted bed reactor and heated to 550° C., while 30 NL/min of nitrogen was used as the spouting gas. HDPE was charged to the reactor at 1 g/min. The reaction products are shown in Table 2. 135 grams of Catalyst A, from Example 3, was added to the same reactor as described above, with the exception that a draft tube and confiner were installed in the reactor. The addition of the draft tube and confiner lowered the minimum spouting velocity, defined as the velocity of the nitrogen at the inlet of the reactor, when the bed of catalyst begins to spout. With the inclusion of the draft tube and confiner, a stable spouted bed was established at a nitrogen flow of 10 NL/min, as compared to 30 NL/min for the case where no draft tube or confiner was use. The reaction products from this experiment are also shown in Table 2.

The use of the draft tube and confiner significantly increased the yield of propylene and butene and decreased the formation of heavy oils in the >C12 range. With the combination of the conical spouted bed reactor having a draft tube and confiner and catalyst composition having greater than 40% w/w ZSM-5, a combined light olefins yield (ethylene, propylene, and butenes) of greater than 50 wt % was realized.

TABLE 2

Yields of HDPE pyrolysis on Catalyst A in spouted bed reactor, with and without a draft tube and confiner.

| | No Draft Tube or Confiner | Draft Tube and confiner |
|---|---|---|
| $N_2$ Flowrate, NL/min | 30 | 10 |
| $U_{N2}/U_{ms}$ | 1.2 | 1.43 |
| Yields | | |
| Methane | 0.41 | 0.68 |
| Ethane | 1.53 | 1.59 |
| Propylene | 22.1 | 27.0 |
| Propane | 0.28 | 0.53 |
| Butenes | 20.9 | 22.3 |
| Butanes | 6.4 | 6.8 |
| Total $C_4$ | 51.7 | 59.0 |
| $C_3$ Olefinicity | 0.99 | 0.98 |
| $C_4$ Olefinicity | 0.77 | 0.77 |
| $C_3/C_4$ | 0.82 | 0.94 |
| $C_1$-$C_4$ | 51.7 | 59 |
| $C_5$-$C_{11}$ | 43.3 | 36.4 |
| $C_{12}$ + LCO + Bottoms | 5.0 | 4.6 |

Example 5

Catalysts A (an illustrative embodiment) and B (comparative) from Example 3, which contained 40% and 30% ZSM-5, respectively, were used in the catalytic pyrolysis of polypropylene in a spouted bed reactor, containing a draft tube and a confiner. Polypropylene (160° C. m.p.), due to its higher melting point, is more difficult than HDPE (135° C. m.p.) to convert to lighter products. However, the data on Table 3 show that on Catalyst A, which contained 40% ZSM-5, it is possible to convert PP to 48.6 wt % total light olefins (ethylene, propylene and butenes), almost as good as that of HDPE. However, with only 30% ZSM-5 content, Catalyst B yielded about 0.2% lower ethylene, 3.9% lower propylene and 1.8% lower butenes. These results show that with the combination of a conical spouted bed reactor having a draft tube and confiner and a catalyst composition having greater than 40% w/w ZSM-5, a high yield of light olefins, suitable for petrochemical feedstock, was obtained from plastics pyrolysis.

TABLE 3

Yields of catalytic pyrolysis of PP in a spouted bed reactor with draft tube and confiner on catalysts containing varying levels of ZSM-5.

| | Catalyst A No Draft Tube or Confiner | Catalyst B Draft Tube and confiner |
|---|---|---|
| $N_2$ Flowrate, NL/min | 10 | 10 |
| $U_{N2}/U_{ms}$ | 1.43 | 1.43 |
| Yields | | |
| Methane | 0.63 | 0.18 |
| Ethane | 1.78 | 1.56 |
| Propylene | 25.6 | 21.7 |
| Propane | 0.4 | 0.16 |
| Butenes | 21.2 | 19.4 |
| Butanes | 6.41 | 5.87 |
| Total $C_4$ | 56.1 | 49 |
| $C_3$ Olefinicity | 0.98 | 0.99 |
| $C_4$ Olefinicity | 0.77 | 0.77 |
| $C_3/C_4$ | 0.94 | 0.87 |
| $C_5$-$C_{11}$ | 35.6 | 43 |
| $C_{12}$ + LCO + Bottoms | 8.37 | 8.02 |

Example 6

Spray-dried catalyst samples with 70 micron average particle size were prepared as described below. A 40% slurry of zeolite, pseudoboehmite alumina, phosphoric acid, and halloysite clay are sent to spray-dry and then calcined at 450-600° C. to which makes them into spherical particles with 0.2-2 wt % TV. The resulting particles were steamed for 24 hours at 1500° F. to simulate the deactivation of the catalyst during commercial application. Catalysts of illustrative embodiments (Catalysts C and D) containing 40% and 55% ZSM-5 respectively, were compared to the same catalysts with 50% of a commercially available Faujasite-based FCC catalyst blended in (comparative samples, Catalyst E and F). Properties of the catalysts are shown in Table 4.

TABLE 4

Properties of Spray-dried catalysts

| | Catalyst C 55% ZSM-5 21% $Al_2O_3$ 13% $P_2O_5$ 11% Clay | Catalyst D 40% ZSM-5 26% $Al_2O_3$ 13% $P_2O_5$ 21% Clay | Catalyst E[1] 28% ZSM-5 | Catalyst F[2] 20% ZSM-5 |
|---|---|---|---|---|
| ABD (g/cm$^3$) | | | | |
| $Al_2O_3$ (%) | 21 | 26 | 39 | 39 |
| $Fe_2O_3$ (%) | 0 | .65 | .46 | .55 |
| $Na_2O$ (%) | | | | |
| $P_2O_5$ (%) | 13 | 13 | 7 | 6 |
| Average Particle Size (mm) | 70 | 70 | 70 | 70 |
| BET Surface Area (m$^2$/g) | 192 | 140 | 180 | 163 |

[1]Prepared from Catalyst C with 50% Faujasite-based FCC catalyst
[2]Prepared from Catalyst D with 50% Faujasite-based FCC catalyst

Example 7

Catalysts C and D (illustrative embodiments) and Catalyst E and F (comparative) from Example 6, were used in the catalytic pyrolysis of polyethylene in a spouted bed reactor, containing a draft tube and a confiner. The results are summarized in Table 5. These results show that adding Y zeolite-zeolite based catalyst as a 50/50 blend with ZSM-5 catalyst decreased olefins yields (Compare Catalyst C with Catalyst E and Catalyst D with Catalyst F).

TABLE 5

Yields of catalytic pyrolysis of PE in a spouted bed reactor with draft tube and confiner on spray-dried catalysts containing varying levels of ZSM-5 and Y.

| | Catalyst C Draft Tube and Confiner | Catalyst D Draft Tube and Confiner | Catalyst E Draft Tube and Confiner | Catalyst F Draft Tube and Confiner |
|---|---|---|---|---|
| $N_2$ Flowrate, NL/min | 5.2 | 5.2 | 5.2 | 5.2 |
| $U_{N2}/U_{ms}$ | 4 | 4 | 4 | 4 |
| Methane | 0.09 | 1.43 | 0.77 | 0.75 |
| Ethylene | 4.03 | 3.01 | 2.77 | 1.52 |
| Ethane | 0.27 | 0.18 | 0.19 | 0.2 |
| Propylene | 26.9 | 25.3 | 22 | 17.4 |
| Propane | 3.91 | 2.06 | 1.83 | 1.09 |
| Butenes | 18.4 | 19 | 17.3 | 15.8 |
| Butanes | 8.45 | 6.55 | 6.85 | 6.18 |
| Total $C_4$ | 62 | 57.5 | 51.8 | 42.9 |
| $C_3$ Olefinicity | 0.87 | 0.92 | 0.92 | 0.94 |
| $C_4$ Olefinicity | 0.69 | 0.74 | 0.72 | 0.72 |
| $C_3/C_4$ | 1.15 | 1.1 | 0.99 | 0.84 |
| $C_5$-$C_{11}$ | 36 | 34.6 | 38.3 | 40.6 |
| $C_{12}$ + LCO + Bottoms | 2.1 | 7.9 | 10.0 | 16.5 |

Para. 1. A process of producing at least one or more of olefins and aromatic compounds from a plastic feedstock, the process comprising:

- contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds;
- wherein the catalyst composition comprises greater than about 40% w/w of ZSM-5, based on the total weight of the catalyst composition.

Para. 2. The process of Para. 1, wherein the catalyst composition comprises greater than about 45% w/w, about 55% w/w, about 60% w/w, about 65% w/w, about 70% w/w, about 75% w/w, or about 80% w/w of ZSM-5, based on the total weight of the catalyst composition.

Para. 3. The process of Para. 1, wherein the catalyst composition comprises from about 40% w/w to about 80% w/w, from about 45% w/w to about 80% w/w, from about 50% w/w to about 80% w/w, from about 55% w/w to about 80% w/w, from about 60% w/w to 80% w/w, from about 65% w/w to about 80% w/w, from about 70% w/w to about 80 w/w, or from about 75% w/w to about 80% w/w of ZSM-5, based on the total weight of the catalyst composition.

Para. 4. The process of any one of Paras. 1-3, wherein the catalyst composition comprises particles having a size ranging from about 0.05 mm to about 5 mm.

Para. 5. The process of any one of Paras. 1-4, wherein the catalyst composition comprises particles having a size of from about 0.8 mm to about 5 mm or from about 1.0 mm to about 2.5 mm.

Para. 6. The process of any one of Paras. 1-5, wherein the catalyst composition comprises particles having a size of about 0.05, about 0.06 mm, about 0.07 mm, about 0.08 mm, about 0.09 mm, about 0.1 mm, about 0.2 mm, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, or about 2.5 mm.

Para. 7. The process of any one of Paras. 1-6, wherein the catalyst composition comprises from about 5% w/w to about 15% w/w $P_2O_5$, based on the total weight of the composition.

Para. 8. The process of any one of Paras. 1-7, wherein the catalyst composition comprises about 5%, about 6% w/w, about 7% w/w, about 8% w/w, about 9% w/w, about 10% w/w, about 11% w/w, about 12% w/w, about 13% w/w, about 14% w/w, or about 15% w/w of $P_2O_5$, based on the total weight of the composition.

Para. 9. The process of any one of Paras. 1-8, wherein the catalyst composition comprises no greater than about 40% w/w $Al_2O_3$, based on the total weight of the composition.

Para. 10. The process of any one of Paras. 1-9, wherein the ZSM-5 has a crystallite size of less than about 0.4 microns.

Para. 11. The process of any one of Paras. 1-10, wherein the catalyst composition is formed by spray drying, extrusion, or a bead forming method.

Para. 12. The process of Para. 11, wherein the bead forming method is agglomeration.

Para. 13. The process of any one of Paras. 1-12, wherein the ZSM-5 is combined with an active matrix within a particle.

Para. 14. The process of any one of Paras. 1-12, wherein the ZSM-5 is combined with an active matrix as a separate particle.

Para. 15. The process of any one of Paras. 1-14, wherein the ZSM-5 is combined with one or more zeolites selected from ZSM-11, faujasite, mordenite, and beta.

Para. 16. The process of Para. 15, wherein the combination of ZSM-5 with one or more zeolites promotes pyrolysis of large molecules.

Para. 17. The process of Para. 16, wherein the ZSM-5 is combined with one or more Y-type zeolites selected from Zeolite Y, ultrastable Y zeolite (USY), rare earth exchanged Y (REY), rare earth exchanged USY (REUSY), dealuminated Y (DeAIY), and ultrahydrophobic Y (UHPY) as a separate particle.

Para. 18. The process of any one of Paras. 1-17, wherein contacting the plastic feedstock and the catalyst composition is at a temperature of from about 500° C. to about 600° C.

Para. 19. The process of any one of Paras. 1-17, wherein contacting the plastic feedstock and the catalyst composition is at a temperature of about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., or about 650° C.

Para. 20. The process of any one of Paras. 1-19, wherein the plastic feedstock comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

Para. 21. The process of Para. 20, wherein the plastic feedstock comprises polyethylene dissolved in a solvent.

Para. 22. The process of Para. 21, wherein the plastic feedstock comprises polypropylene dissolved in a solvent.

Para. 23. The process of any one of Paras. 1-22, wherein the at least one or more olefins is selected from ethylene, propylene, and butenes.

Para. 24. The process of Para. 23, wherein the process converts the plastic feedstock to greater than about 35 wt %, about 40 wt %, about 45 wt %, about 50 wt %, about 55 wt %, about 60 wt %, about 65 wt %, or about 70 wt % of ethylene, propylene, and butenes.

Para. 25. The process of Para. 23, wherein the process converts the plastic feedstock to greater than about 20 wt %, about 25 wt %, about 35 wt %, about 40 wt %, about 45 wt %, about 50 wt %, about 55 wt %, about 60 wt %, about 65 wt %, or about 70 wt % of propylene.

Para. 26. The process of any one of Paras. 1-22, wherein the at least one or more aromatic compounds is selected from benzene, toluene, and xylenes.

Para. 27. The process of any one of Paras. 1-26, wherein the time period sufficient to allow at least a portion of the plastic feedstock to be converted to at least one or more olefins and aromatic compounds is a space time ranging from about 0.2 to about 10 hours.

Para. 28. The process of any one of Paras. 1-27, wherein the conical spouted bed reactor comprises a draft tube and a confiner.

Para. 29. The process of Para. 28, wherein the conical spouted bed reactor has a gas inlet opening of $D_O$ and a diameter of the cylindrical section of the conical spouted bed reactor of $D_C$; the confiner has a diameter of $D_G$; and the draft tube has a distance from the top of the draft tube and the bottom of the draft tube of $H_G$.

Para. 30. The process of Para. 29, wherein $H_G$ is from about 3 to about $4 \times D_O$.

Para. 31. The process of Para. 30, wherein $H_G$ is from about 1.5 to $2.5 \times D_O$.

Para. 32. The process of Para. 31, wherein $H_G$ is about $2 \times D_O$.

Para. 33. The process of any one of Paras. 29-32, wherein $D_G$ is from about $3 \times D_O$ to about 0.7 $D_C$.

Para. 34. The process of Para. 33, wherein $D_G$ is from about 4 to about $6 \times D_O$.

Para. 35. The process of Para. 34, wherein $D_G$ is about $5 \times D_O$ While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms “comprising,” “including,” “containing,” etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase “consisting essentially of” will be understood to include those elements specifically recited and those additional elements that do not materially affect the basic and novel characteristics of the claimed technology. The phrase “consisting of” excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as “up to,” “at least,”

"greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A process of producing at least one or more of olefins and aromatic compounds from a plastic feedstock, the process comprising:

contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds;

wherein the catalyst composition comprises greater than about 40% w/w of ZSM-5, based on the total weight of the catalyst composition;

wherein the at least one or more olefins is selected from ethylene, propylene, and butenes;

wherein the process converts the plastic feedstock to greater than about 20 wt % of propylene.

2. The process of claim 1, wherein the catalyst composition comprises greater than about 45% w/w of ZSM-5, based on the total weight of the catalyst composition.

3. The process of claim 1, wherein the catalyst composition comprises particles having a size ranging from about 0.05 mm to about 5 mm.

4. The process of claim 1, wherein the catalyst composition comprises from about 5% w/w to about 15% w/w P2O5, based on the total weight of the composition.

5. The process of claim 1, wherein the catalyst composition comprises no greater than about 40% w/w Al2O3, based on the total weight of the composition.

6. The process of claim 1, wherein the ZSM-5 has a crystallite size of less than about 0.4 microns.

7. The process of claim 1, wherein the catalyst composition is formed by spray drying, extrusion, or a bead forming method.

8. The process of claim 1, wherein the ZSM-5 is combined with an active matrix within a particle.

9. The process of claim 1, wherein the ZSM-5 is combined with an active matrix as a separate particle.

10. The process of claim 1, wherein the ZSM-5 is combined with one or more zeolites selected from ZSM-11, faujasite, mordenite, and beta.

11. The process of claim 1, wherein contacting the plastic feedstock and the catalyst composition is at a temperature of from about 500° C. to about 600° C.

12. The process of claim 1, wherein the plastic feedstock comprises at least one of polyolefins, polyethylene, polypropylene, polystyrene, polyethylene terephthalate (PET), polyvinyl chloride (PVC), polyamide, polycarbonate, polyurethane, polyester, natural and synthetic rubber, tires, filled polymers, composites, plastic alloys, and plastics dissolved in a solvent.

13. The process of claim 1, wherein the process converts the plastic feedstock to greater than about 35 wt % of ethylene, propylene, and butenes.

14. The process of claim 1, wherein the process converts the plastic feedstock to greater than about 25 wt % of propylene.

15. The process of claim 1, wherein the at least one or more aromatic compounds is selected from benzene, toluene, and xylenes.

16. The process of claim 1, wherein the conical spouted bed reactor comprises a draft tube and a confiner.

17. The process of claim 16, wherein the conical spouted bed reactor has a gas inlet opening of $D_O$ and a diameter of the cylindrical section of the conical spouted bed reactor of $D_C$; the confiner has a diameter of $D_G$; and the draft tube has a distance from the top of the draft tube to the bottom of the draft tube of $H_G$; wherein $H_G$ is from about 3 to about $4 \times D_O$.

18. The process of claim 16, wherein the conical spouted bed reactor has a gas inlet opening of $D_O$ and a diameter of the cylindrical section of the conical spouted bed reactor of $D_C$; the confiner has a diameter of $D_G$; and the draft tube has a distance from the top of the draft tube to the bottom of the draft tube of $H_G$; wherein $D_G$ is from about $3 \times D_O$ to about $0.7\ D_C$.

19. A process of producing at least one or more of olefins and aromatic compounds from a plastic feedstock, the process comprising:

contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds;

wherein the catalyst composition comprises greater than about 40% w/w of ZSM-5, based on the total weight of the catalyst composition and;

wherein the ZSM-5 is combined with an active matrix as a separate particle.

20. A process of producing at least one or more of olefins and aromatic compounds from a plastic feedstock, the process comprising:

contacting a plastic feedstock and a catalyst composition at a temperature from about 450° C. to about 650° C. in a conical spouted bed reactor and for a time period sufficient to allow at least a portion of the plastic feedstock to be converted to at least one or more olefins and aromatic compounds and;

wherein the at least one or more olefins is selected from ethylene, propylene, and butenes;

wherein the process converts the plastic feedstock to greater than about 20 wt % of propylene;

wherein the catalyst composition comprises greater than 50% w/w of ZSM-5, based on the total weight of the catalyst composition and wherein the ZSM-5 is combined with an active matrix as a separate particle.

* * * * *